United States Patent [19]

Hans et al.

[11] Patent Number: 4,976,659
[45] Date of Patent: Dec. 11, 1990

[54] SLIDE RAIL FOR TIGHTENING A TRANSMISSION

[75] Inventors: Rüdiger Hans, Niederwerrn; Otmar Winkler, Schweinfurt, both of Fed. Rep. of Germany

[73] Assignee: SKF GmbH, Schweinfurt, Fed. Rep. of Germany

[21] Appl. No.: 317,008

[22] Filed: Feb. 28, 1989

[30] Foreign Application Priority Data

Mar. 25, 1988 [DE] Fed. Rep. of Germany ....... 3810188

[51] Int. Cl.[5] .............................................. F16H 7/08
[52] U.S. Cl. .................................................... 474/111
[58] Field of Search ................ 474/101, 109, 111, 133, 474/135, 136, 138, 140, 113–117

[56] References Cited

U.S. PATENT DOCUMENTS

| | | |
|---|---|---|
| 3,148,555 | 9/1964 | Peras .................................. 474/111 |
| 3,198,025 | 8/1965 | Peras .................................. 474/111 |
| 3,358,522 | 12/1967 | Poyser et al. ...................... 474/111 |

FOREIGN PATENT DOCUMENTS

| | | |
|---|---|---|
| 0113685 | 7/1984 | European Pat. Off. . |
| 0025556 | 10/1982 | Japan ................................. 474/111 |

*Primary Examiner*—Thuy M. Bui
*Attorney, Agent, or Firm*—Rosen, Dainow & Jacobs

[57] ABSTRACT

A slide rail for tightening a chain has a pivot bearing at one end. A torsion spring is arranged coaxially thereto. The pivot bearing is designed as a slide bearing and is provided with friction disks under initial spring pressure axially, which disks effect a frictional damping of pivotal motion for suppressing vibrations and characteristic disturbances. The slide rail is made in one piece, of synthetic material, and is provided with recesses for the pivot bearing, a torsion spring and frictional dampers.

25 Claims, 2 Drawing Sheets

SLIDE RAIL FOR TIGHTENING A TRANSMISSION

BACKGROUND OF THE INVENTION

1. Field of the Invention

The invention relates to a slide rail for tightening a transmission connecting two drive wheels.

2. Description of the Prior Art

A slide rail of this type has already been disclosed by EP 0113685. It is adjusted, via a lever system and a spring, in the direction of the chain. It thus automatically tightens the unloaded section of the chain running between two drive wheels. The slide rail guides the chain on a relatively long guide surface and is therefore curved in conformity with the unstretched course of the chain. In addition, with steady elongation of the chain, the slide rail must ensure secure guidance during the entire period of operation. Owing to unavoidable periods of inertia, due to shock loads or uneven travel, from time to time the load-free section of the chain becomes somewhat elongated, whereby the slide rail yields to the force of the spring and at least equalizes the sectional variations in length occurring between the drive wheels. However, especially with very strong accelerations in the motional behavior of the slide rail, the latter may briefly detach from the chain and as a possible result fail to resume its task as a tightening element in timely enough fashion. To avoid these disadvantages, attempts have been made to influence the motion of the slide rail by a hydraulic damping piston.

Hydraulic dampers, however, have the disadvantage that after a certain period of operation they exhibit an idle stroke, albeit a small one, due to losses from leakage. Under these conditions damping can no longer be expected. However, slight motions, due to vibrations, which occur in the chain-tightening devices result in increased wear and especially in severe noise.

SUMMARY OF THE INVENTION

The object of the invention is to provide a slide rail for tightening a transmission, by which as noiseless and reliable as possible an operation, with little wear, is obtained.

This object is accomplished in that the pivot bearing has a frictional damper acting in its pivotal direction.

The friction damper is effective upon very slight motions and thus suppresses even vibrations emanating from the transmission or generally from micromotions of the chain produced in the combustion engine of a motor vehicle. In addition, natural vibrations of the slide rail or of the spring which under some conditions are produced by rough operation of the engine, particularly in lower speed ranges or due to the roadway, are suppressed. Frictional dampers, which in general can be produced more simply and more cheaply, can be fitted into a very narrow space and are essentially maintenance-free. Basically, with pivotal motion of the slide rail the pivotal bearing allows two surfaces under tension with respect to one another to slide on one another in order to obtain frictional damping.

DESCRIPTION OF THE PREFERRED EMBODIMENT

Figure 1:
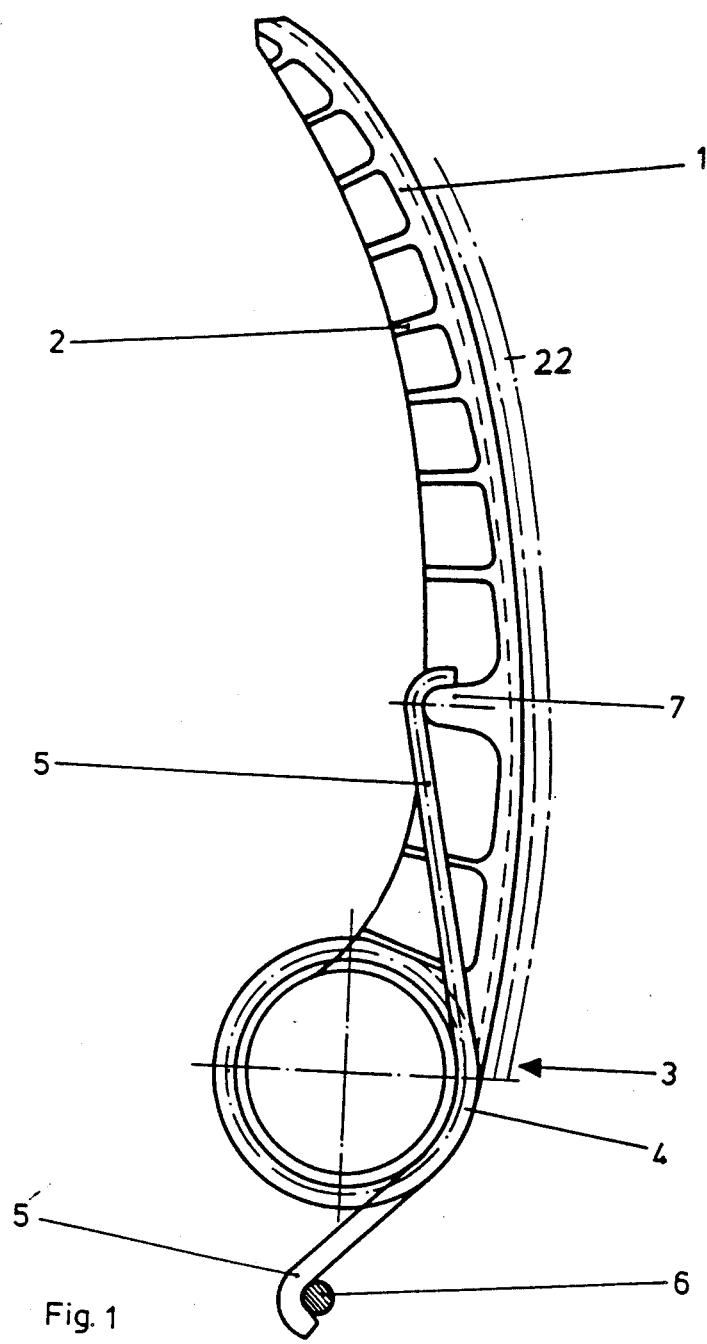
FIG. 1 shows a top view of a slide rail for tightening a chain.

The slide rail 1 shown in the drawing figures serves for tightening a chain, not illustrated, in the unloaded section between two sprocket wheels. It is made in one piece of synthetic material low in wear characteristics, has stiffening ribs 2 running crosswise and is curved in conformance with the course of the chain. At one end is provided a pivot bearing 3 and lying coaxially over the bearing is arranged a torsion spring 4, whose one leg 5 is supported on a stationary pin 6 and whose other leg 5 engaged in a reinforced projection 7, in order thereby to press the slide rail 1 against the chain.

Figure 2:
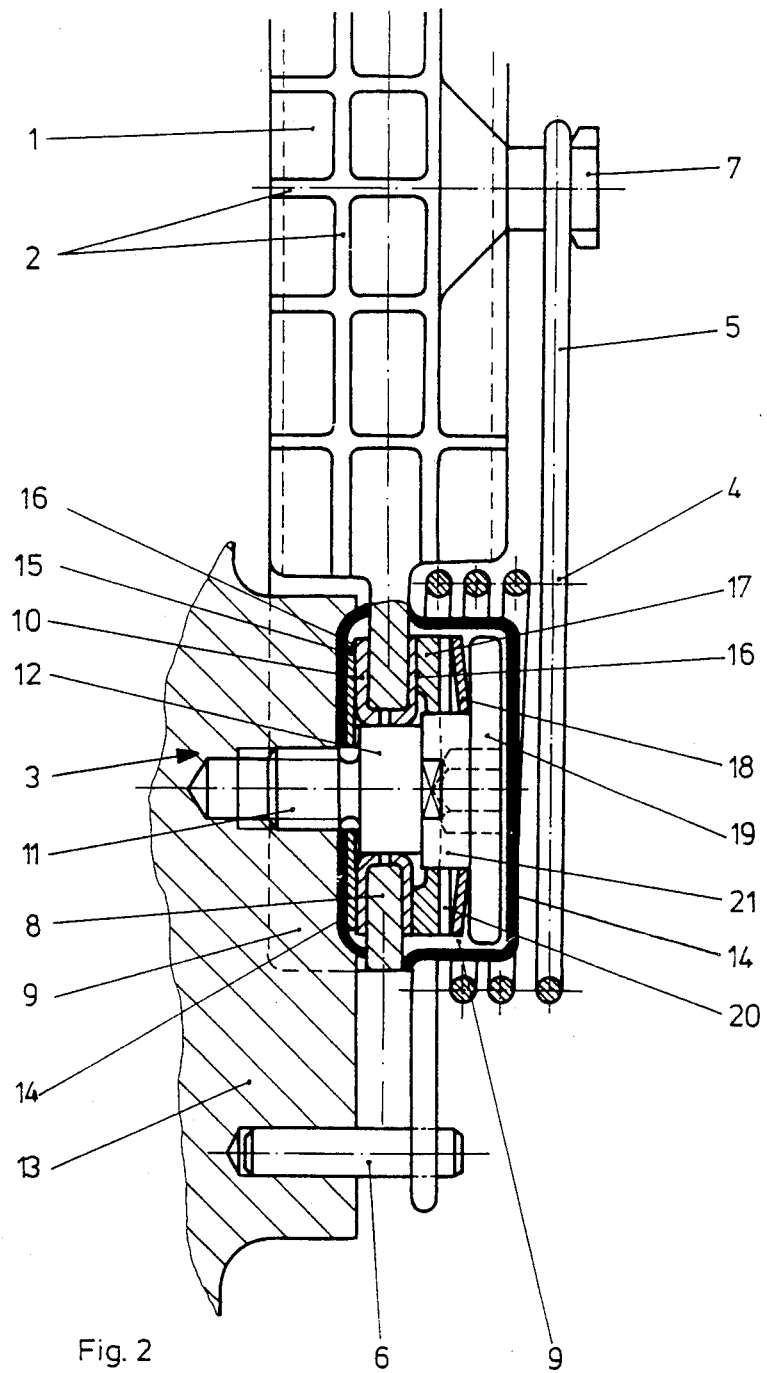
FIG. 2 shows a partial enlarged longitudinal section through the pivot bearing of the slide rail of FIG. 1.

The region of the pivot bearing 3 may be better seen in detail in FIG. 2, which shows an enlarged longitudinal section. In the axial center the slide rail 1 in this region has a reinforced bearing section 8 with recesses 9 arranged on both sides. The bearing section 8 is provided with a bore in which flanged sleeves 10, made of sheet metal with a friction coating of synthetic material, are inserted on both ends. By means of a screw 11, which has a corresponding slide-bearing section 12, the slide rail 1 is fixed and pivotably movable on a stationary housing section 13, a corresponding projection of which engages the recess 9 arranged at the left in the figure. In this region there is additionally incorporated a protective cap 14, which covers a large-area axial slide bearing that further stabilizes the swinging motion. The sliding disk 15 provided therefore is arranged securely against twisting by the screw 11 and in addition forms friction surfaces which, as described below, serve for the damping of friction.

In the recess 9 arranged on the right is incorporated another friction disk 17, which is clamped via a disk spring 18 between a flange 19 of the screw 11 and the right flange sleeve 10. By way of grooves 20 and projections in the disk springs 18 and by a groove not illustrated in detail, the friction disk 17 is connected, secure against twisting, between the shank 21 of the screw 11 and the disk spring 18 by the screw 11. In this way, upon swivel motion of the slide rail 1 only the frictional surfaces 16 of the friction disk 17 and of the flanged sleeve 10 slide on one another In this way and because of the frictional surfaces 16, already described above, in the left recess 9 a strong damping of friction and, at the same time, a directionally stable swivel motion is produced The right-hand arrangement of the pivot bearing 3 and/or frictional damper 17 is alternatively covered with a protective cap 14. The torsion spring is arranged coaxially over the latter.

What is claimed is:

1. A slide rail assembly for tightening a transmission connecting two drive wheels comprising:
    a slide rail;
    a pivot bearing located near one end of the slide rail, said pivot bearing comprising a frictional damper, said frictional damper capable of pivoting; and
    a spring producing pressure against the slide rail.

2. A slide rail according to claim 1 wherein said transmission comprises a chain.

3. A slide rail according to claim 2 wherein said spring comprises a torsion spring mounted outside the periphery of and coaxial with the pivot bearing.

4. A slide rail according to claim 1 wherein said spring comprises a torsion spring mounted outside the periphery of and coaxial with the pivot bearing.

5. A slide rail according to claim 4 wherein the slide rail is an injection-molded element and has a plurality of recesses provided at one end thereof into which said pivot bearing and said torsion spring respectively fit.

6. A slide rail according to claim 1 wherein said frictional damper comprises a sliding disk having a frictional surface and a friction disk which abuts said frictional surface.

7. A slide rail according to claim 6 wherein said spring comprises a torsion spring mounted outside the periphery of and coaxial with the pivot bearing.

8. A slide rail according to claim 1 wherein the slide rail is an injection-molded element and has a plurality of recesses provided at one end thereof for the accommodation of said pivot bearing and said spring.

9. A slide rail assembly for tightening a transmission connecting two drive wheels comprising:
  a slide rail;
  means for frictionally damping motion of said slide rail; and
  means for producing pressure against said slide rail in a direction toward said transmission.

10. The slide rail assembly of claim 9 wherein said means for frictionally damping motion comprises a pivot bearing located near one end of the slide rail, said pivot bearing comprising a frictional damper, said frictional damper capable of pivoting.

11. The slide rail assembly of claim 10 wherein said transmission comprises a chain.

12. A slide rail according to claim 10 wherein said frictional damper comprises a sliding disk having a frictional surface, a friction disk which abuts said frictional surface.

13. A slide rail according to claim 12 wherein said means for producing pressure comprises a torsion spring mounted outside the periphery of and coaxial with the pivot bearing.

14. A slide rail according to claim 10 wherein said means for frictionally damping motion comprises a pivot bearing, said means for producing pressure comprises a torsion spring and wherein the slide rail is an injection-molded element and has a plurality of recesses provided at one end thereof for the accommmodation of said pivot bearing and said torsion spring.

15. The slide rail assembly of claim 9 wherein said means for producing pressure against said slide rail in a direction toward said transmission comprises a spring.

16. The slide rail assembly of claim 15 wherein said transmission comprises a chain.

17. A slide rail according to claim 15 wherein said means for frictionally damping motion comprises a pivot bearing, said means for producing pressure comprises a torsion spring and wherein the slide rail is an injection-molded element and has a plurality of recesses provided at one end thereof for the accommodation of said pivot bearing and said torsion spring.

18. The slide rail assembly of claim 9 wherein said means for frictionally damping motion comprises a pivot bearing located near one end of the slide rail, said pivot bearing comprising a frictional damper, said frictional damper capable of pivoting and wherein said means for producing pressure against said slide rail in a direction toward said transmission comprises a spring.

19. The slide rail assembly of claim 18 wherein said transmission comprises a chain.

20. A slide rail according to claim 18 wherein said frictional damper comprises a sliding disk having a frictional surface and comprises a friction disk which abuts said frictional surface.

21. A slide rail according to claim 20 wherein said means for producing pressure comprises a torsion spring mounted outside the periphery of and coaxial with the pivot bearing.

22. A slide rail according to claim 18 wherein said means for frictionally damping motion comprises a pivot bearing, said means for producing pressure comprises a torsion spring and wherein the slide rail is an injection-molded element and has a plurality of recesses provided at one end thereof for the accommodation of said pivot bearing and said torsion spring.

23. The slide rail assembly of claim 9 wherein said transmission comprises a chain.

24. A slide rail according to claim 9 wherein said means for frictionally damping motion comprises a pivot bearing, said means for producing pressure comprises a torsion spring and wherein the slide rail is an injection-molded element and has a plurality of recesses provided at one end thereof for the accommodation of said pivot bearing and said torsion spring.

25. A slide rail according to claim 9 wherein said frictional damping means provides damping in both directions of movement of the slide rail, toward and away from said transmission.

* * * * *